US012185864B2

(12) United States Patent
Rotta et al.

(10) Patent No.: US 12,185,864 B2
(45) Date of Patent: Jan. 7, 2025

(54) MOTORIZED BREWING UNIT

(71) Applicant: LUIGI LAVAZZA S.P.A., Turin (IT)

(72) Inventors: Denis Rotta, Turin (IT); Gabriele Molinaro, Turin (IT)

(73) Assignee: LUIGI LAVAZZA S.P.A., Turin (IT)

( * ) Notice: Subject to any disclaimer, the term of this patent is extended or adjusted under 35 U.S.C. 154(b) by 614 days.

(21) Appl. No.: 17/596,450

(22) PCT Filed: Jun. 10, 2020

(86) PCT No.: PCT/IB2020/055431
§ 371 (c)(1),
(2) Date: Dec. 10, 2021

(87) PCT Pub. No.: WO2020/250134
PCT Pub. Date: Dec. 17, 2020

(65) Prior Publication Data
US 2022/0304498 A1 Sep. 29, 2022

(30) Foreign Application Priority Data
Jun. 13, 2019 (IT) .................. 102019000008844

(51) Int. Cl.
*A47J 31/36* (2006.01)
*A47J 31/44* (2006.01)

(52) U.S. Cl.
CPC ....... *A47J 31/3633* (2013.01); *A47J 31/4403* (2013.01)

(58) Field of Classification Search
CPC .. A47J 31/4403; A47J 31/3633; A47J 31/468; A47J 31/3676; A47J 31/4492;
(Continued)

(56) References Cited

U.S. PATENT DOCUMENTS

| 10,045,654 B2* | 8/2018 | Burrows | A23F 5/26 |
| 2013/0008316 A1* | 1/2013 | Hoglauer | A47J 31/4407 99/295 |

(Continued)

FOREIGN PATENT DOCUMENTS

| EP | 2 581 002 A2 | 4/2013 |
| EP | 2 608 705 A1 | 7/2013 |

(Continued)

OTHER PUBLICATIONS

International Search Report for PCT/IB2020/055431 dated Sep. 28, 2020 (PCT/ISA/210).

(Continued)

*Primary Examiner* — Eric S Stapleton
(74) *Attorney, Agent, or Firm* — Sughrue Mion, PLLC

(57) ABSTRACT

A brewing unit includes a first part having a receptacle for receiving a capsule, a cartridge or a compacted pod, a second part movable relative to the first part between an open position in which the first and second parts are at a distance from each other, and a closed position in which the second and first parts are coupled to one another to define a brewing chamber. An electric motor controls movement of the second part relative to the first part. A transmission mechanism arranged between the electric motor and the first or second part comprises a movable member whose position is univocally associated with the relative position of the second part with respect to the first part. An electronic control unit controls the electric motor. A micro-switch switches between an ON operational state and an OFF operational state depending on the position of the movable member.

16 Claims, 6 Drawing Sheets

(58) Field of Classification Search
CPC ...... A47J 31/54; A47J 31/407; A47J 31/3628; A47J 31/3623
USPC .......................................................... 99/295
See application file for complete search history.

(56) References Cited

U.S. PATENT DOCUMENTS

| | | | | |
|---|---|---|---|---|
| 2014/0197193 | A1* | 7/2014 | Wallerstorfer | A47J 31/60 222/23 |
| 2015/0327717 | A1* | 11/2015 | Burrows | A47J 31/3628 99/295 |
| 2015/0327719 | A1* | 11/2015 | Burrows | A47J 31/3628 99/283 |
| 2022/0304498 | A1* | 9/2022 | Rotta | A47J 31/4403 |

FOREIGN PATENT DOCUMENTS

| | | |
|---|---|---|
| WO | 2005/058111 A1 | 6/2005 |
| WO | 2011/015978 A2 | 2/2011 |
| WO | 2011/147794 A1 | 12/2011 |
| WO | 2012/025258 A1 | 3/2012 |

OTHER PUBLICATIONS

Written Opinion for PCT/IB2020/055431 dated Sep. 28, 2020 (PCT/ISA/237).

\* cited by examiner

MOTORIZED BREWING UNIT

CROSS-REFERENCE TO RELATED APPLICATIONS

This application is a National Phase Application of PCT International Application No. PCT/IB2020/055431, having an International Filing Date of Jun. 10, 2020, claiming priority to Italian Patent Application No. 102019000008844, filed Jun. 13, 2019 each of which is hereby incorporated by reference in its entirety.

FIELD OF THE INVENTION

The present invention relates to a motorized brewing unit for a machine for preparing beverages, in particular coffee, using a capsule or cartridge containing one or more ingredients, in particular coffee powder, or alternatively by using a compacted pod consisting of one or more ingredients, in particular coffee.

In the following description, for the sake of simplicity, reference will be made to the use of a capsule, but it is clear that the invention is not limited to a brewing unit adapted to operate using capsules, but is more generally also applicable to brewing units that use cartridges or, alternatively, compacted pods.

BACKGROUND OF THE INVENTION

Beverage preparation machines are known that comprise a motorized brewing unit, in which the brewing unit comprises two parts adapted to define a brewing chamber and an electric motor arranged to control, by means of a transmission mechanism, the relative movement of the two parts between an open position, in which the two parts are at a distance from each other to allow insertion of a capsule, and a closed position, in which the two parts are coupled to one another to enclose the brewing chamber.

For example, such a motorized brewing unit is known from patent EP 2,608,705 B1, on which the preamble of the attached independent claim 1 is based. The object of the present invention is to provide an improved motorized brewing unit with respect to the prior art discussed above.

SUMMARY OF THE INVENTION

This and other objects are achieved by a brewing unit as described and claimed herein. The present invention also provides a method for controlling a brewing unit.

Advantageous embodiments of the brewing unit according to the invention and advantageous embodiments of the control method according to the invention are specified in the dependent claims, the content of which is intended as being an integral part of the following description.

In summary, the invention is based on the concept of:
associating a micro-switch configured to switch between a first and a second operational state to a movable member of the transmission mechanism of the brewing unit, depending on the position of such movable member,
using the information relating to the operational state of the micro-switch, alongside with the information relating to the direction of rotation of the electric motor, to determine in which phase of the movement the first and the second part are in, among a plurality of phases of the relative movement of the second part with respect to the first part between the open position and the closed position, and
controlling the electric motor according to a given rotational speed profile, depending on the phase of the movement thus determined.

It is therefore possible to define, a priori, a plurality of phases of the movement of the first and the second part of the brewing unit and, by means of the micro-switch, to detect which of these phases the first and the second part are in during operation and what the rotational speed profile, according to which the electric motor is controlled, therefore has to be. In this way, the movement of the first and the second part of the brewing unit may be controlled by the electronic control unit of the brewing unit without having to rely on timing the phases, but verifying that a subsequent phase of the movement has been effectively reached.

The electronic control unit of the brewing unit is preferably programmed to:
associate a given threshold data value for an electric control parameter representative of the power consumption of the electric motor to each of the phases of the movement,
compare, during each phase of the movement, a measured value for the electric control parameter with the threshold value associated with this phase of the movement, and
activate a given security function, for example to stop the electric motor or reverse the direction of rotation thereof, when the measured value exceeds the threshold value.

The brewing unit according to the invention preferably also comprises a cam member having a profile having a plurality of protrusions and cavities, which are arranged alternated to each other and are each associated with a respective phase of said plurality of phases of the movement, and a probe member adapted to detect the profile of the cam member, wherein the cam member is connected to the movable member of the transmission mechanism such that the position of the cam member is univocally associated with the position of the movable member, and wherein the micro-switch is operatively associated with the probe member so as to switch from one operational state to another one when the probe member senses the passage from a protrusion to a cavity, or vice versa, of the profile of the cam member as a result of the movement of the movable member.

The movable member is preferably a gear wheel having external teeth and the cam member is integrally fixed to this gear wheel for conjoint rotation and is arranged on a radially inner side thereof with respect to the external teeth.

BRIEF DESCRIPTION OF THE FIGURES

Further features and advantages of the present invention will become clearer from the following detailed description, given purely by way of non-limiting example with reference to the attached drawings, in which.

DETAILED DESCRIPTION

Figure 1:
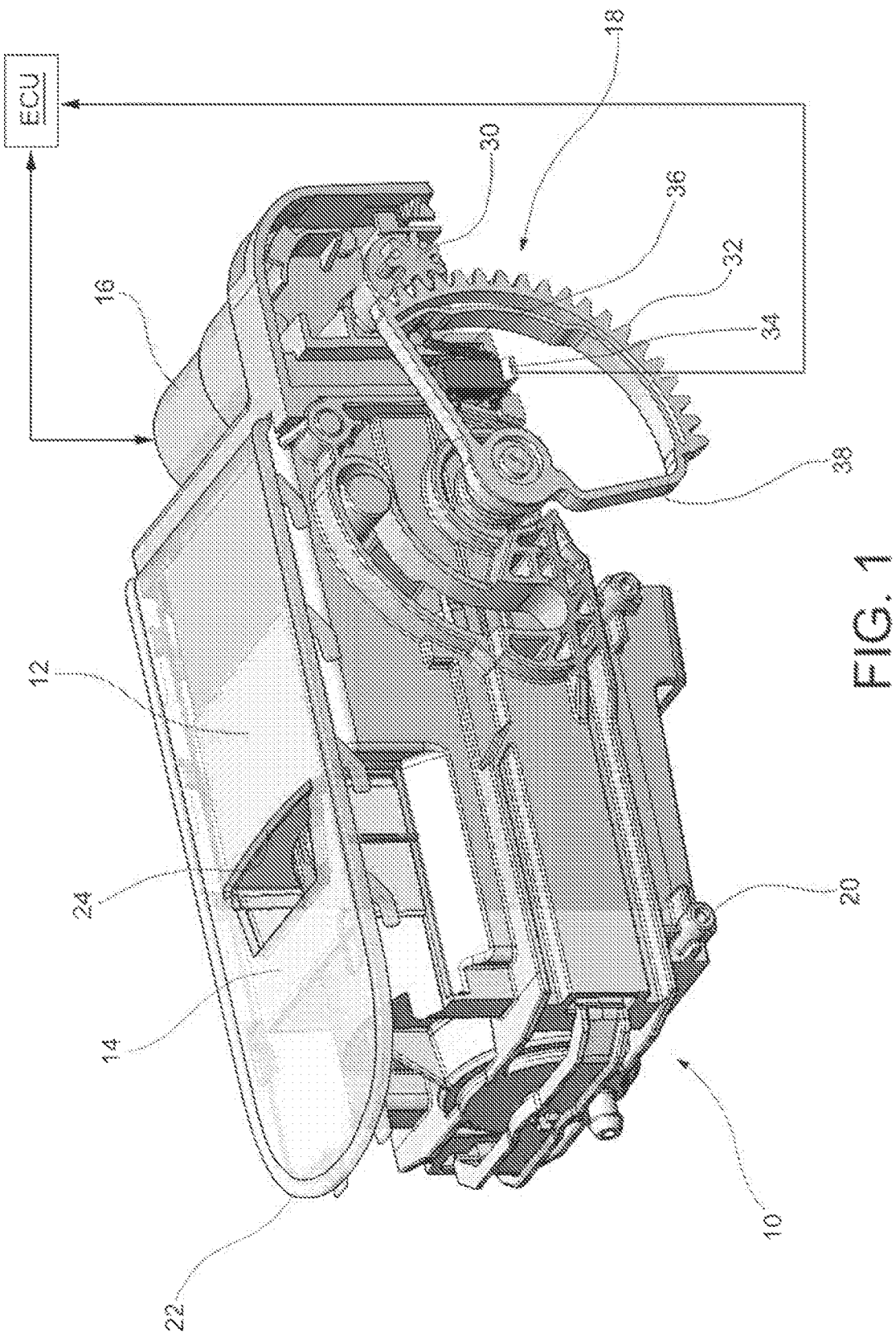
FIG. 1 is a perspective view of a brewing unit according to the invention in an initial phase of the relative movement of the second part with respect to the first part from the open position to the closed position.

With initial reference to FIGS. 1 to 5, a brewing unit for a machine for preparing beverages, in particular coffee, from a capsule containing one or more ingredients, in particular coffee powder, is indicated as a whole by 10.

As already explained previously, even though the invention is described with reference to the use of a capsule such as a "package" containing the ingredient, or ingredients, for preparing the beverage, the invention should not be construed as being limited to a brewing unit that may operate using a capsule, but as also including the case in which a cartridge or other similar package adapted to prepare beverages by brewing is provided instead of a capsule. Furthermore, the invention is likewise applicable to a brewing unit adapted to operate using compacted pods.

The brewing unit 10 essentially comprises a first part 12 and a second part 14 adapted to move relative to one another, an electric motor 16 adapted to control the relative movement between the first part 12 and the second part 14, a transmission mechanism 18 arranged between the electric motor 16 and one of the two parts 12 and 14 (the second part 14 in the present case), and a support structure 20 that supports the first part 12, the second part 14, the electric motor 16 and the transmission mechanism 18.

Figure 2:
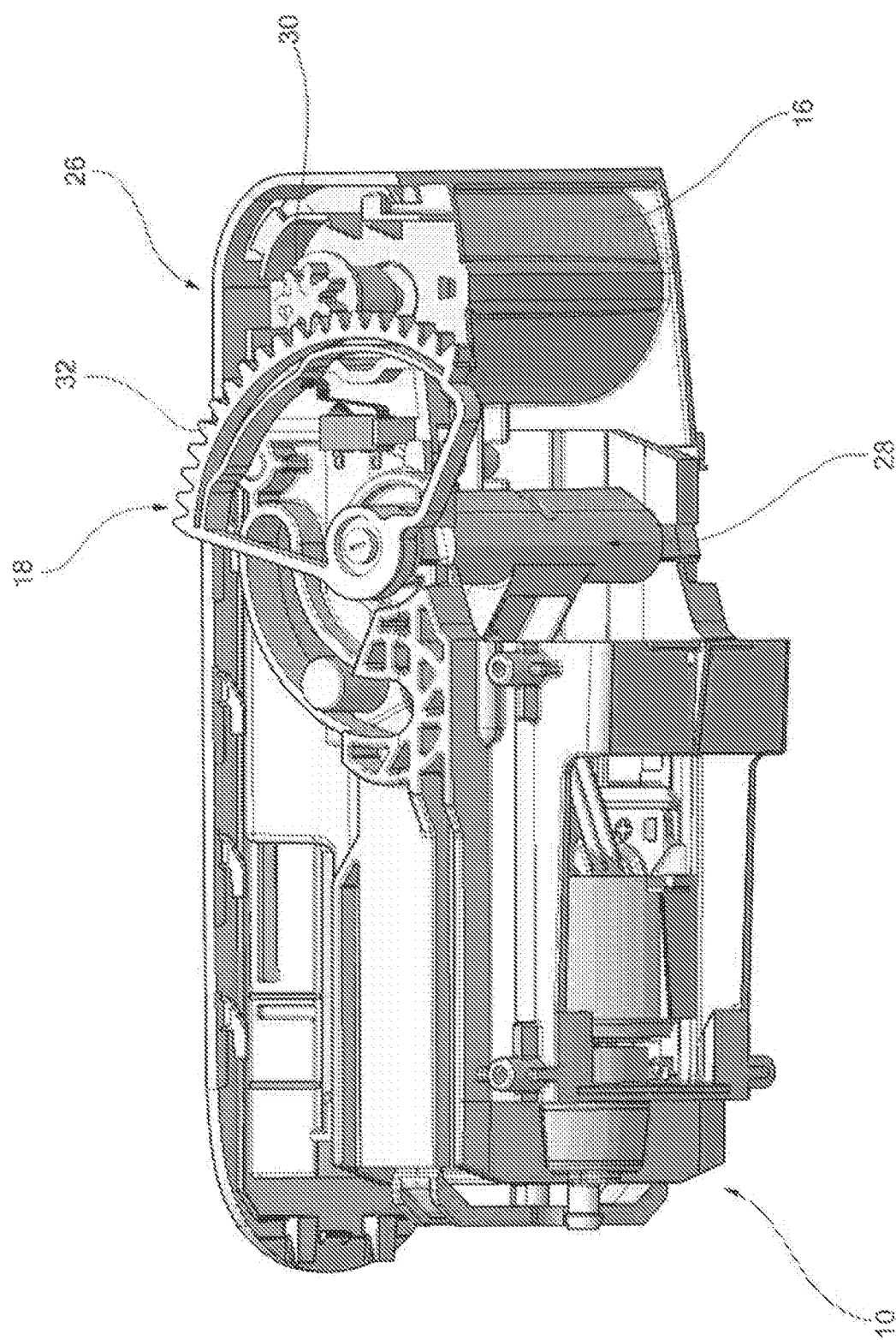
FIGS. 2 and 3 are a perspective view from below and a perspective view from above, respectively, of the brewing unit in FIG. 1 in an intermediate phase of the relative movement of the second part with respect to the first part from the open position to the closed position.
Figure 3:
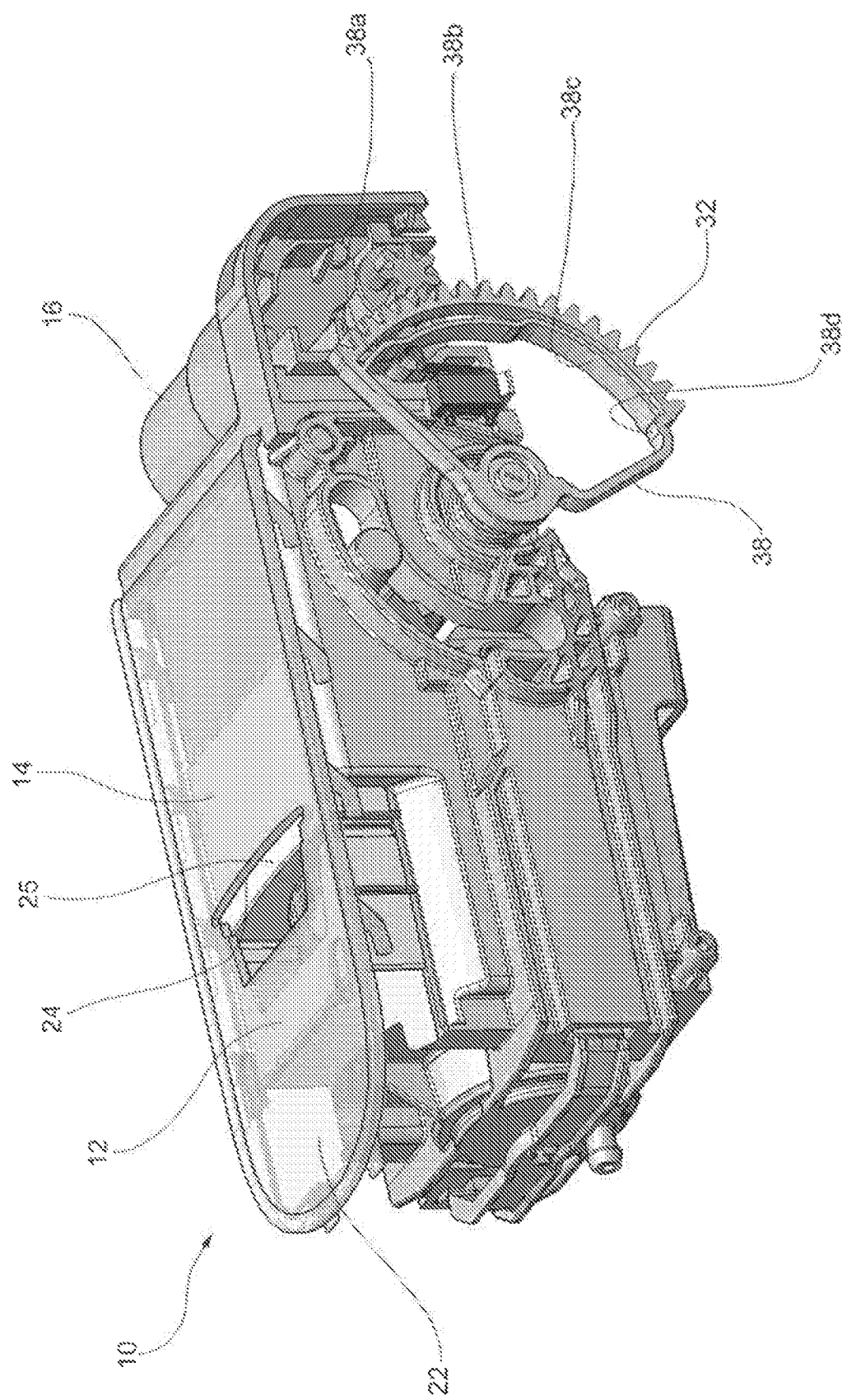
Figure 4:
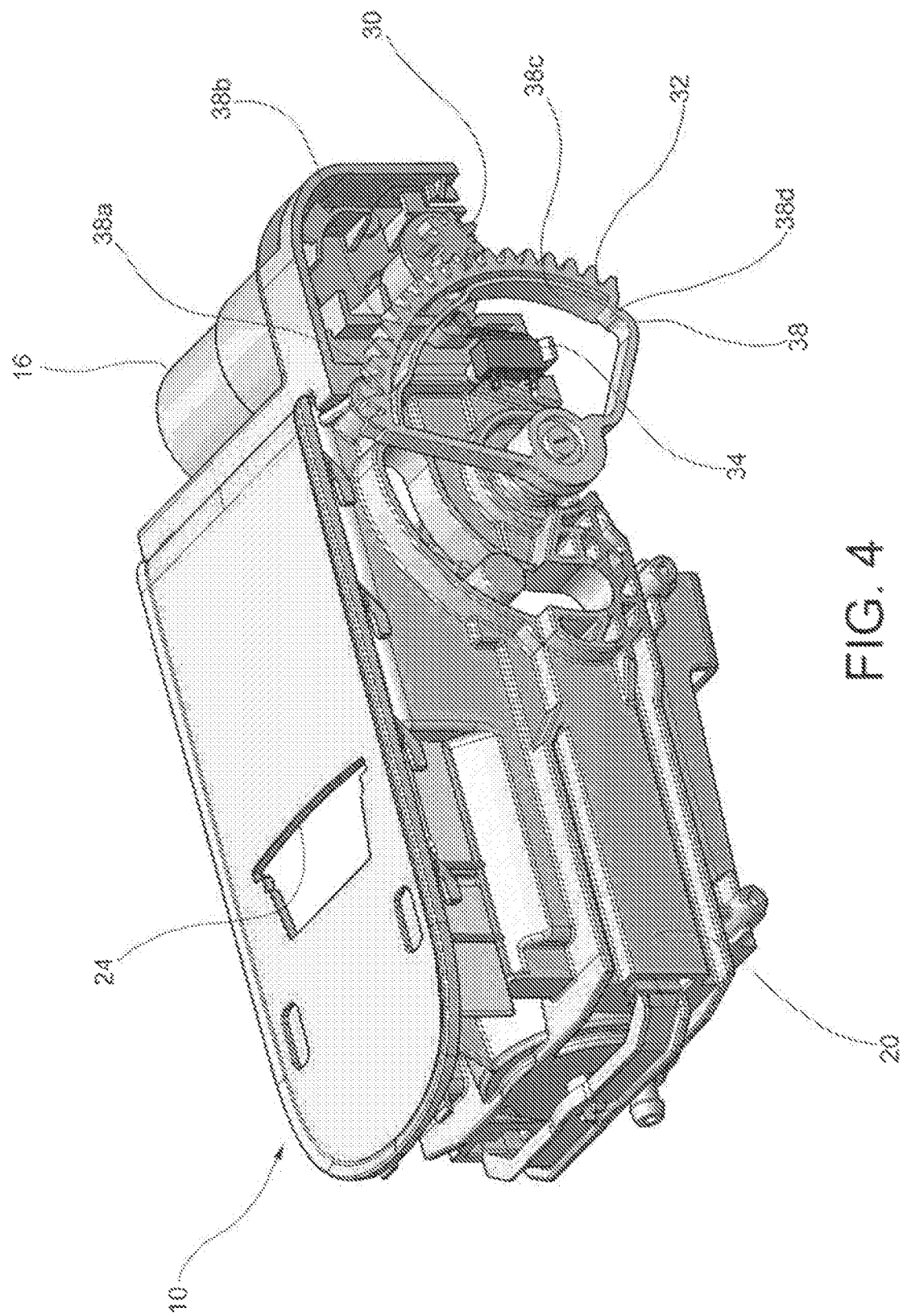
FIG. 4 is a perspective view from above of the brewing unit in FIG. 1 in another intermediate phase of the relative movement of the second part with respect to the first part from the open position to the closed position.
Figure 5:
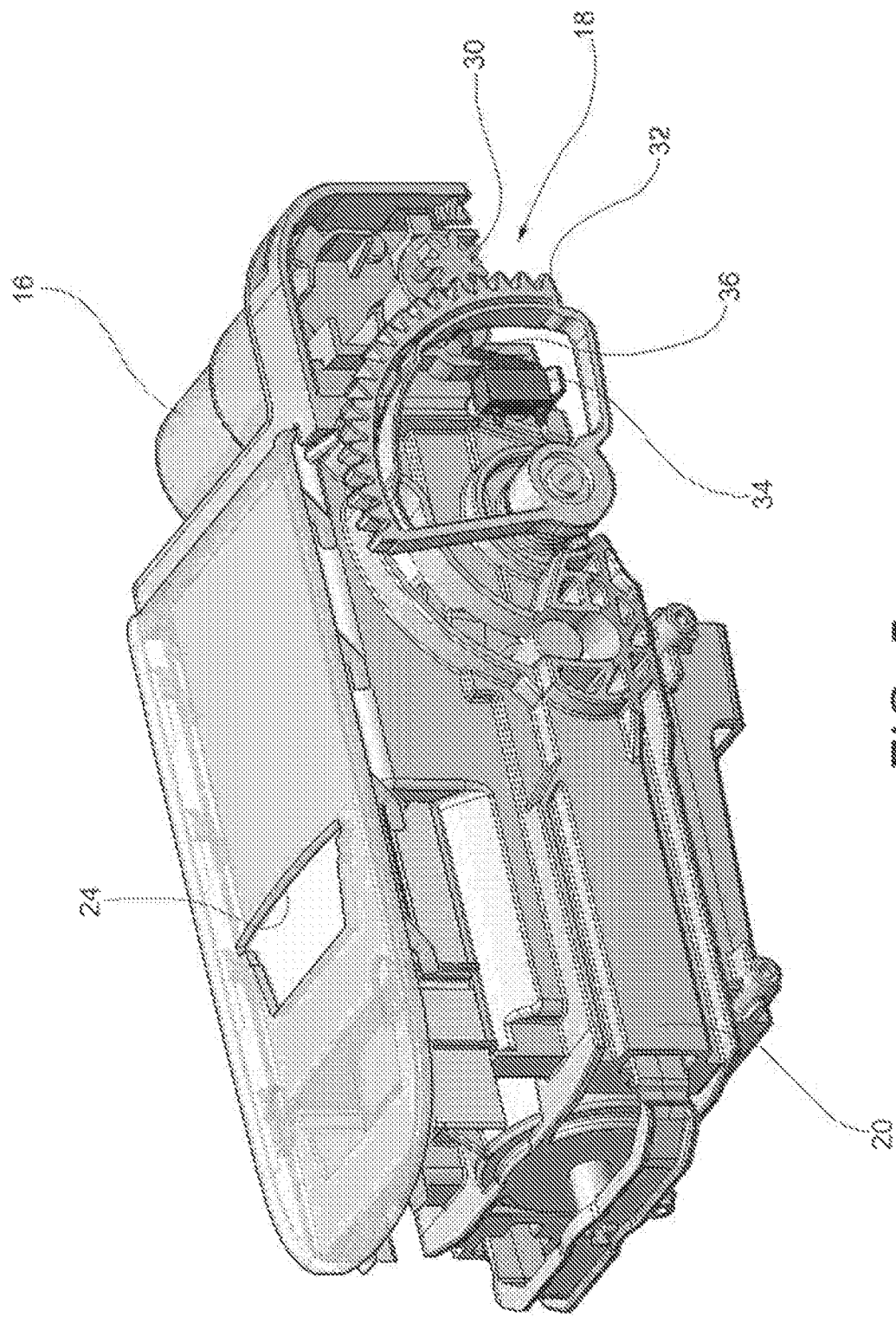
FIG. 5 is a perspective view of the brewing unit in FIG. 1 in an final phase of the relative movement of the second part with respect to the first part from the open position to the closed position.

In the illustrated embodiment, the first part 12 is stationary, that is is fixed with respect to the support structure 20, while the second part 14 is movable, in particular in a rectilinear direction, between an open position (shown in FIG. 1), in which the second part 14 is at a distance from the first part 12 in order to allow the introduction of a capsule (not shown), and a closed position (shown in FIG. 5), in which the second part 14 is coupled to the first part 12 in order to define a brewing chamber together therewith, passing through a plurality of intermediate positions (as shown in FIGS. 2 to 4).

The first part 12 comprises a receptacle (not shown) adapted to receive the capsule and to form, together with the second part 14, the brewing chamber. The invention is, however, likewise applicable to the case in which the receptacle is defined in the second part 14, as well as when the receptacle is partially defined in each of the two parts 12 and 14.

In order to insert the capsule into the receptacle, a passage 24 is defined, for example in a lid 22 (transparently depicted in FIG. 1) mounted on the support structure 20, which passage has a suitable shape and via which the operator may introduce the capsule when the first part 12 and the second part 14 are in the open position (FIG. 1). A window 25 is associated with the second part 14 and is integrally fixed thereto so as to move in a translational manner therewith, and is configured to progressively close the passage 24 as the second part 14 moves from the open position to the closed position.

As mentioned, the transmission mechanism 18 is arranged between the electric motor 16 and the second part 14 in order to transmit the motion generated by the electric motor 16 thereto, such that, when the electric motor 16 is supplied with a given voltage, the second part 14 moves with respect to the first part 12 in the direction from the open position to the closed position, while, when the electric motor 16 is supplied with a voltage that is opposite to the previous voltage, the second part 14 moves with respect to the first part 12 in the opposite direction, that is in the direction from the closed position to the open position.

The transmission mechanism 18 comprises a reduction unit 26 and a motion conversion unit 28.

The reduction unit 26 is preferably formed as a gear reduction unit comprising a pinion 30, which is fitted on a shaft of the electric motor 16 in order to be controlled thereby so as to rotate, and a gear wheel 32 (or better still, as in the embodiment shown, a sector of a gear wheel) that meshes with the pinion 30. One or more intermediate gear wheels may be arranged between the pinion 30 and the gear wheel 32.

The motion conversion unit 28 is configured to convert the rotary motion of the final element (driven gear wheel) of the reduction unit 26 into a linear motion of the second part 14. The motion conversion unit 28 may be formed by a toggle mechanism, for example. In this way, a relative position of the second part 14 with respect to the first part 12 is associated with the angular position of the gear wheel 32. As already mentioned, the brewing unit 10 also comprises a micro-switch 34, the operational state of which is operatively associated with the angular position of the gear wheel 32. In particular, the operational state of the micro-switch 34 may be switched between two values or states, respectively an ON operational state and an OFF operational state, for example by means of the mechanical action of a probe member 36 that is associated with the gear wheel 32.

More specifically, according to the embodiment shown in FIGS. 1 to 5, the brewing unit 10 comprises a cam member 38 having a profile having a plurality of protrusions and cavities arranged alternated to each other and are each associated with a respective phase of the movement of the second part 14 with respect to the first part 12 between the open position and the closed position. The cam member 38 is integrally connected to the gear wheel 32 for conjoint rotation such that the angular position of the cam member 38 is univocally associated with the angular position of the gear wheel 32. In the example illustrated in particular, the profile of the cam member 38 has two protrusions that alternate with two cavities, namely a first cavity 38a, a first protrusion 38b, a second cavity 38c, and a second protrusion 38d. The number of protrusions and cavities may of course also differ.

Specifically, according to the embodiment shown in FIGS. 1 to 5, the cam member 38 is arranged on a radially internal side of the gear wheel 32. In this case, the cavities are at a first radial distance from the center of rotation of the gear wheel 32, while the protrusions are at a second radial distance from the center of rotation of the gear wheel 32 that is smaller than the first radial distance.

By virtue of the design of the micro-switch 34, the probe member 36 and the cam member 38 described above, the operational state of the micro-switch 34 switches from ON to OFF during the rotational movement of the gear wheel 32. In fact, as the gear wheel 32 rotates, the probe member 36 comes into contact with a subsequent protrusion or cavity, thus causing the change from the operational state O of the micro-switch 34 from ON to OFF, and vice versa. For example, if the probe member 36 is in contact with the first cavity 38a in the cam member 38 and the micro-switch 34 is in the OFF operational state in a first stage, when the probe member 36 comes into contact with the first protrusion 38b of the cam member 38 during the rotational movement of the gear wheel 32, the micro-switch is moved into the ON operational state.

The brewing unit 10 also comprises an electric control unit ECU (shown schematically in FIG. 1 only) adapted to control the electric motor 16.

In particular, the electronic control unit ECU is programmed to associate reaching a subsequent phase of the movement of the second part 14 with respect to the first part 12 with each switch of the operational state of the micro-switch 34, and to control the electric motor 16 according to a given speed profile depending on the phase of the movement that is reached.

In order to clarify this inventive concept, an example of the operation of the brewing unit will now be described in detail with reference to the graph shown in FIG. 6, too.

FIGS. 1, 3, 4 and 5 sequentially describe four successive stages of the closing movement of the brewing unit 10, that is the movement of the second part 14 towards the first part 12 from the open position, in which the spacing between the second part 14 and the first part 12 is greatest.

Figure 6:
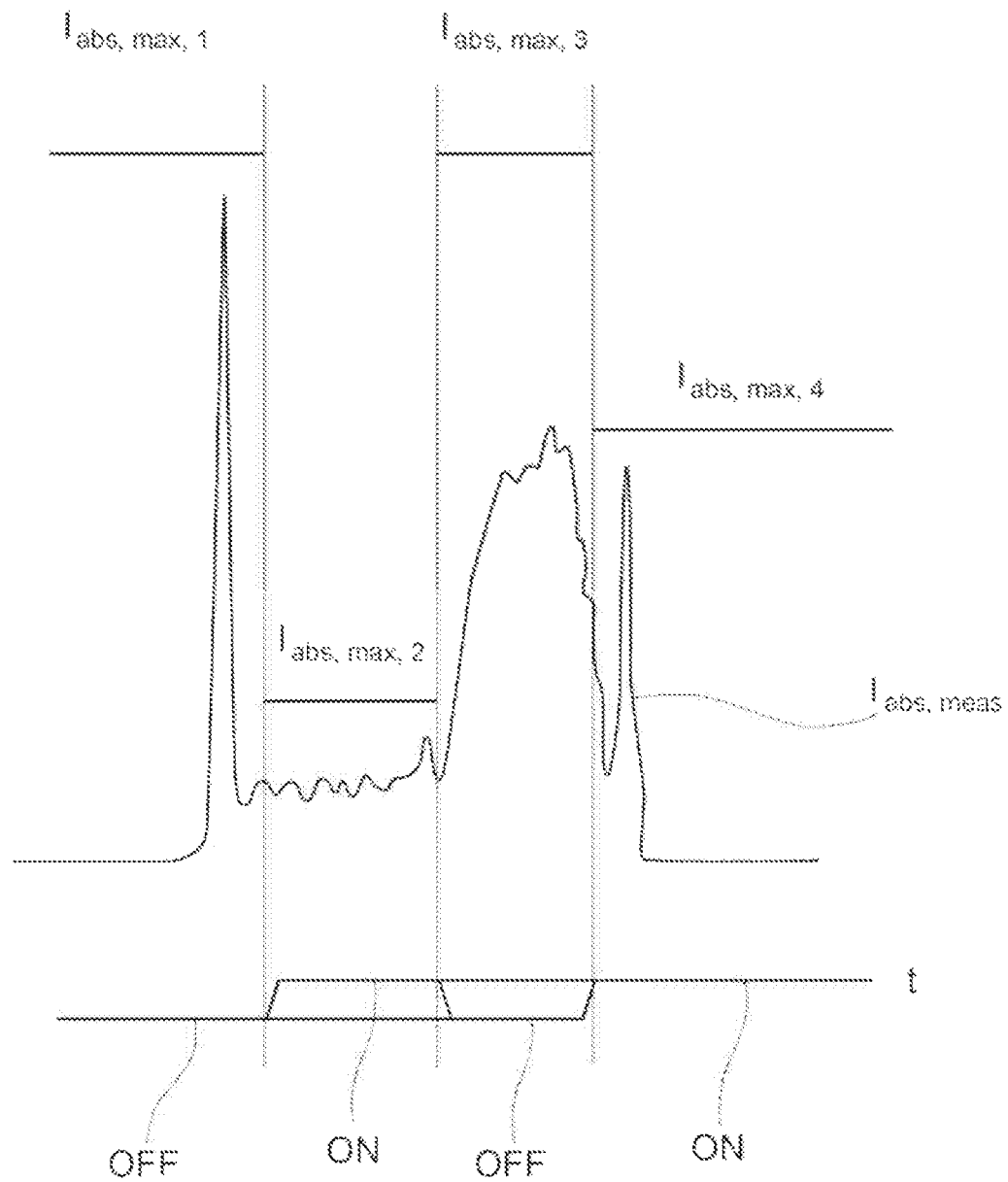
FIG. 6 is a schematic graph that shows the trends of the threshold value for the electric control parameter (current), the measured value for this electric control parameter, and the operational state of the micro-switch of the brewing unit in FIG. 1 during the relative movement of the second part with respect to the first part from the open position to the closed position.

FIG. 6 shows a discontinuous graph of the threshold value for an electric control parameter of the electric motor 16 at the top, the trend of the measured value for this electric control parameter in the middle and the trend of the operational state of the micro-switch 34 during the movement of the second part 14 with respect to the first part 12 from the open position to the closed position at the bottom.

In FIG. 1, the brewing unit 10 is shown with the second part 14 in the open position. In this position, the micro-switch 34 is in a first operational state, for example the OFF operational state, while the probe member 36 is in contact with the first cavity 38a in the cam member 38. With the brewing unit in this operating condition, the operator may insert a capsule into the receptacle via the passage 24.

At this point, the electronic control unit ECU controls the activation of the electric motor 16 in order to bring about the movement of the second part 14 with respect to the first part 12 into the closed position. During the initial phase of the movement, which comprises the stage at which the second part 14 is still stationary in the open position, the electric motor 16 has to supply a relative high starting torque in order to set the second part 14 in motion.

By means of the rotational movement of the gear wheel 32 caused by the activation of the electric motor 16, the probe member 36 comes into contact with the first protrusion 38b of the cam member 38, as may be seen in FIG. 3, thereby inducing a first switch of the operational state (in this example, from the OFF operational state to the ON operational state) of the micro-switch 34. The electronic control unit ECU is programmed to associate reaching an intermediate phase (shown in FIGS. 3 and 4) of the movement of the second part 14 with respect to the first part 12 with the first switch of the operational state of the micro-switch 34. In this intermediate phase, in order to move the second part 14 towards the first part 12, it is sufficient for the electric motor 16 to supply a lower torque than it does during the initial phase. As may be seen in FIGS. 3 and 4, during this intermediate phase, the window 25 moves integrally with the second part 14, thus progressively closing the passage 24 so as to minimize the risk of obstruction or of introducing foreign objects or obstacles via the passage 24.

By means of the rotational movement of the gear wheel 32, the probe member 36 comes into contact with the second cavity 38c in the cam member 38, thereby causing a further switch of the operational state (in this case, from the ON operational state to the OFF operational state) of the micro-switch 34. The electronic control unit ECU associates the arrival of the second part 14 into the closed position with this additional switch of the operational state of the micro-switch 34 (shown in FIG. 5). In this phase of the movement, the electric motor 16 will have to supply a sufficiently high motor torque to ensure that the brewing chamber is sealingly closed and to oppose the reaction caused by the possible puncture of the capsule by means of perforating elements provided in the first part 12 and/or in the second part 14.

Lastly, the movement of the second part 14 with respect to the first part 12 continues until an end stroke position (not shown) is reached. The rotational movement of the gear wheel 32 in this final phase of the movement ensures that the probe member 36 comes into contact with the second protrusion 38d of the cam member 38, thereby causing a further switch of the operational state (in this case, from the OFF operational state to the ON operational state) of the micro-switch 34. In this final phase of the movement, the electric motor 16 does not have to supply any torque, and the irreversibility of the mechanism forming the motion conversion unit 28 ensures that the second part 14 stays in the end stroke position.

In order to determine in which phase of the movement the first and the second part 12 and 14 are, in addition to the information relating to the operational state of the micro-switch 34, the electronic control unit ECU also uses the information relating to the direction of rotation of the electric motor 16, which may be determined, for example, on the basis of the supply voltage supplied to the electric motor 16. In fact, on the basis of the direction of rotation of the electric motor 16, it is possible to determine if the second part 14 is moving from the open position to the closed position, or vice versa. Therefore, the electronic control unit ECU is programmed to determine in which phase of the movement the first and the second part 12 and 14 are on the basis of the operational state of the micro-switch 34 and on the basis of the direction of rotation of the electric motor 16. Depending on the phase of the movement thus determined, the electronic control unit ECU controls the electric motor 16 according to a given speed profile.

According to one embodiment of the invention, the electronic control unit ECU is also programmed to associate a particular threshold value $I_{abs,max}$ for an electric control parameter $I_{abs}$, such as the intensity of power consumption of the electric motor 16, which is representative of the power consumption of the electric motor 16, with each phase of the movement of the second part 14 with respect to the first part 12. In each of the above-mentioned phases of the movement of the second part 14 with respect to the first part 12, the electronic control unit ECU is programmed to compare a measured value $I_{abs,meas}$ of the electric control parameter $I_{abs}$ with the threshold value $I_{abs,max}$ associated with this particular phase of the movement. If the measured value $I_{abs,meas}$ for the electric control parameter $I_{abs}$ is greater than the threshold value $I_{abs,max}$, the electronic control unit ECU is further programmed to control the activation of a set security function, for example stopping the electric motor 16 and/or reversing the direction of rotation of the electric motor 16.

In the example illustrated in the drawings, in which four phases of the movement of the second part 14 with respect to the first part 12 from the open position to the closed position are identified, the electronic control unit ECU will associate a first threshold value $I_{abs,max,1}$ for the electric control parameter $I_{abs}$ with the initial phase of the movement, a second threshold value $I_{abs,max,2}$ with the intermediate phase of the movement, said second threshold value $I_{abs,max,2}$ being lower than or equal to the first threshold value $I_{abs,max,1}$, a third threshold value $I_{abs,max,3}$ with the final phase of the movement, said third threshold value $I_{abs,max,3}$ being of approximately the same order of magnitude as the first threshold value $I_{abs,max,1}$, and a fourth threshold value $I_{abs,max,4}$ with the end stroke phase of the movement, said fourth threshold value $I_{abs,max,4}$ being comprised between the first threshold value $I_{abs,max,1}$ and the second threshold value $I_{abs,max,2}$.

The threshold values for the electric control parameter $I_{abs}$ are defined by taking into account the torque that the electric motor 16 has to provide. During the initial phase of the movement, the electric motor 16 has to supply a torque that is suitable for setting the second part 14 in motion, and therefore the threshold value $I_{abs,max,1}$ will have to be relatively high during this phase. Then, when the second part 14 is in the intermediate phase of the movement, the electric motor 16 has to supply a relatively low torque, and therefore the threshold value $I_{abs,max,2}$ will be relatively low during this phase. In this way, if the passage 24 is obstructed (for example if the operator inadvertently inserts a finger into this passage), the measured value $I_{abs,meas}$ for the electric control parameter $I_{abs}$ will be higher than the second threshold value $I_{abs,max,2}$, and therefore the electronic control unit ECU will be able to recognize the malfunction condition and activate the security function, for example ordering the electric motor 16 to stop and the direction of rotation thereof to be reversed, if necessary.

During the final phase of the movement, the electric motor 16 has to supply a relatively high torque in order to ensure that the brewing chamber is sealingly closed and to oppose the reaction caused by the possible perforation of the capsule by means of perforating elements provided in the first part 12 and/or in the second part 14, and therefore the third threshold value $I_{abs,max,3}$ has to be relatively high during this phase.

During the end stroke phase of the movement, the threshold value $I_{abs,max,4}$ may, for example, be set to an intermediate value since the electric motor 16 does not have to supply torque; the irreversibility of the toggle mechanism forming the motion conversion unit 28 ensuring that the brewing chamber remains sealingly closed.

When the brewing unit 10 opens, that is during the movement of the second part 14 from the closed position to the open position, the electric motor 16 is supplied with a voltage having an opposite direction to that during the closing process described previously. During this movement, the operational state of the micro-switch 34 develops in the opposite way to that described previously, and may, for example, also be ignored by the electronic control unit ECU, which, during this movement, will use a single threshold value for the electric control parameter. Alternatively, the operational state of the micro-switch 34 may be used by the electronic control unit ECU according to control logics similar to those described with reference to the closing process, that is may be used to determine in which phase of the movement the second part 14 is in between the closed position and the open position.

At the end of the opening process, the electronic control unit ECU may be programmed such that, when the second part 14 has reached the open position, the simultaneous reading of the operational state of the micro-switch 34 (the OFF operational state in the example shown) and of the peak of the measured value $I_{meas,abs}$ for the electric control parameter $I_{meas}$ caused by the end stroke position being reached, which position is opposite the end stroke position of the closing process, causes the electric motor 16 to stop and the predisposition of the brewing unit to a new operating cycle.

When the second part 14 reaches the end stroke position during both the closing and opening process, the electronic control unit ECU is preferably further programmed to command a brief reversal of the second part 14, that is a movement of the second part 14 in the opposite direction to that in which the end stroke position was reached. The course of this reverse movement is no greater than 10%, preferably no greater than 5%, and even more preferably no greater than 2%, for example equal to approximately 1%, of the total course of the movement between the open position and the closed position. This reverse movement makes it possible to reduce the possibility of damaging the brewing unit 10 following overvoltages that would otherwise develop when the second part 14 is in an opening end stroke position or a closing end stroke position.

The electronic control unit ECU is advantageously further programmed to command an emergency opening movement of the second part 14, that is to bring the second part 14 back into the open position, in the case in which, by mistake, for example due to a storage problem or due to an accidental interruption in the power supply to the electronic control unit ECU, the electronic control unit ECU has not saved, or has not managed to determine, which phase of the movement between the open position and the closed position the second part 14 is in.

Of course, without prejudice to the principle of the invention, the embodiments and the implementation details may be largely varied with respect to that described and illustrated purely by way of non-limiting example, without thereby departing from the scope of the invention as defined in the attached claims.

The invention claimed is:

1. A motorized brewing unit for preparing beverages from a capsule, a cartridge or a compacted pod containing at least one ingredient, comprising
    a first part having a receptacle adapted to receive said capsule, cartridge or compacted pod,
    a second part, movable relative to the first part between an open position, in which the first part and the second part are at a distance from each other to allow insertion of said capsule, cartridge or compacted pod into the receptacle, and a closed position, in which the second part and the first part are coupled to each other to define a brewing chamber therebetween,
    an electric motor configured to control movement of the second part relative to the first part between the open position and the closed position,
    a transmission mechanism positioned between the electric motor and the first part or the second part and comprising a movable member, whose position is univocally associated with a relative position of the second part with respect to the first part, and
    an electronic control unit (ECU) configured to control the electric motor, wherein said motorized brewing unit further comprises a micro-switch configured to switch between an ON operational state and an OFF operational state depending on the position of the movable member, the ECU being programmed to:

determine in which phase of relative movement of the first and second parts, among a plurality of movement phases defined between said open and closed positions, the first and second parts are, depending on operational state of the micro-switch and direction of rotation of the electric motor; and control the electric motor according to a given rotational speed profile depending on the determined movement phase.

2. The motorized brewing unit of claim 1, wherein the ECU is further programmed to:

associate, to each phase of said plurality of movement phases, a respective threshold value of an electric control parameter ($I_{abs,max}$) representative of power absorbed by the electric motor;

compare, in each phase of said plurality of movement phases, a measured value of said electric control parameter ($I_{abs,meas}$) with said respective threshold value ($I_{abs,max}$); and activate a safety function when said measured value ($I_{abs,meas}$) is larger than said respective threshold value ($I_{abs,max}$).

3. The motorized brewing unit of claim 1, wherein the ECU is programmed to determine at least:

a first threshold value ($I_{abs,max,1}$) associated with an initial phase of the relative movement of the second part with respect to the first part from the open position to the closed position, said initial phase including the open position, a second threshold value ($I_{abs,max,2}$) associated with an intermediate phase of the relative movement of the second part with respect to the first part from the open position to the closed position, and a third threshold value ($I_{abs,max,3}$) associated with a final phase of the relative movement of the second part with respect to the first part from the open position to the closed position, said final phase including the closed position.

4. The motorized brewing unit of claim 3, wherein the ECU is programmed to determine said first, second and third threshold values ($I_{abs,max,1}$, $I_{abs,max,2}$, $I_{abs,max,3}$) so that when the second part is moving relative to the first part in a direction from the open position to the closed position, said second threshold value ($I_{abs,max,2}$) is lower than, or equal to, said first threshold value ($I_{abs,max,1}$) and said third threshold value ($I_{abs,max,3}$), whereas when the second part is moving relative to the first part in a direction from the closed position to the open position said second threshold value ($I_{abs,max,2}$) is lower than, or equal to, said first threshold value ($I_{abs,max,1}$), which in turn is lower than, or equal to, said third threshold value ($I_{abs,max,3}$).

5. The motorized brewing unit of claim 3, further comprising a cam member with a profile having a plurality of protrusions and cavities which are arranged alternated to each other and are each associated with a respective phase of said plurality of movement phases, wherein said cam member is connected to the movable member of the transmission mechanism so that the position of the cam member is univocally associated with the position of the movable member, and a probe member configured to sense the profile of the cam member, wherein the micro-switch is operationally associated with the probe member so that the micro-switch shifts from one operational state to the other when the probe member senses passage from a protrusion to a cavity of the cam member, or vice versa, as a result of movement of the movable member.

6. The motorized brewing unit of claim 5, wherein said cam member is a rotary member whose angular position is univocally associated with the position of the movable member.

7. The motorized brewing unit of claim 6, wherein the movable member is a rotary member whose angular position is univocally associated with the relative position of the second part with respect to the first part, wherein the movable member is an external gear wheel, and wherein the cam member is connected for rotation with the movable member and is placed on a radially inner side of the movable member with respect to external teeth of the movable member.

8. The motorized brewing unit of claim 1, wherein the movable member is a rotary member whose angular position is univocally associated with the relative position of the second part with respect to the first part.

9. The motorized brewing unit of claim 1, wherein said safety function comprises stopping the electric motor or reversing the direction of rotation of the electric motor.

10. The motorized brewing unit of claim 1, wherein the ECU is further programmed to control, upon reaching the closed position in a movement from the open position to the closed position, or upon reaching the open position in a movement from the closed position to the open position, the movement of the second part relative to the first part in an opposite direction with respect to the direction in which the closed position or the open position, respectively, has been reached.

11. A method for controlling a brewing unit for preparing beverages from a capsule, cartridge or compacted pod containing at least one ingredient, wherein the brewing unit comprises a first part having a receptacle adapted to receive said capsule, cartridge or compacted pod, a second part, movable relative to the first part between an open position, in which the first part and the second part are at a distance from each other to allow insertion of said capsule, cartridge or compacted pod into the receptacle, and a closed position, in which the second part and the first part are coupled to each other to define a brewing chamber therebetween, an electric motor configured to control movement of the second part relative to the first part between the open position and the closed position, a transmission mechanism positioned between the electric motor and the first part or the second part and comprising a movable member, whose position is univocally associated with a relative position of the second part with respect to the first part, said method comprising:

a) determining a direction of rotation of the electric motor based on a power signal of the electric motor;

b) determining in which phase of relative movement of the first and second parts, among a plurality of movement phases defined between said open and closed positions, the first and second parts are, based on the direction of rotation of the electric motor and on an operational state of a micro-switch associated with the movable member and configured to shift between an ON operational state and an OFF operational state depending on the position of the movable member; and c) controlling the electric motor according to a given rotational speed profile depending on the movement phase determined at the previous step.

12. The method of claim 11, further comprising:
d) determining, for each phase of said plurality of movement phases, a respective threshold value of an electric control parameter ($I_{abs,max}$) representative of power absorbed by the electric motor;
e) comparing, in each phase of said plurality of movement phases, a measured value of said electric control parameter ($I_{abs,meas}$) with said respective threshold value ($I_{abs,max}$); and
f) when said measured value ($I_{abs,meas}$) is larger than said respective threshold value ($I_{abs,max}$), activating a given safety function.

13. The method of claim 12, wherein said step of activating a safety function comprises stopping the electric motor or reversing the direction of rotation of the electric motor.

14. The method of claim 12, wherein said step of determining, for each phase of said plurality of movement phases, a respective threshold value comprises the sub-steps of:
d1) determining a first threshold value ($I_{abs,max,1}$) associated with an initial phase of the relative movement of the second part with respect to the first part from the open position to the closed position, said initial phase including the open position;
d2) determining a second threshold value ($I_{abs,max,2}$) associated with an intermediate phase of the relative movement of the second part with respect to the first part from the open position to the closed position; and
d3) determining a third threshold value ($I_{abs,max,3}$) associated with a final phase of the relative movement of the second part with respect to the first part from the open position to the closed position, said final phase including the closed position.

15. The method of claim 14, wherein said first, second and third threshold values ($I_{abs,max,1}$, $I_{abs,max,2}$, $I_{abs,max,3}$) are determined so that when the second part is moving relative to the first part in a direction from the open position to the closed position, said second threshold value ($I_{abs,max,2}$) is lower than, or equal to, said first threshold value ($I_{abs,max,1}$) and said third threshold value ($I_{abs,max,3}$), whereas, when the second part is moving relative to the first part in a direction from the closed position to the open position, said second threshold value ($I_{abs,max,2}$) is lower than, or equal to, said first threshold value ($I_{abs,max,1}$), which in turn is lower than, or equal to, said third threshold value ($I_{abs,max,3}$).

16. The method of claim 11, further comprising:
g) moving, upon reaching the closed position in a movement from the open position to the closed position, or upon reaching the open position in a movement from the closed position to the open position, the second part relative to the first part in an opposite direction with respect to the direction in which the closed position or the open position, respectively, has been reached.

* * * * *